United States Patent
Tollefson

[11] Patent Number: 5,484,117
[45] Date of Patent: Jan. 16, 1996

[54] REEL SPRING FOR A THIN-WALLED VIDEOCASSETTE

[75] Inventor: Dale T. Tollefson, Woodbury, Minn.

[73] Assignee: Minnesota Mining and Manufacturing Company, St. Paul, Minn.

[21] Appl. No.: 221,085

[22] Filed: Mar. 31, 1994

[51] Int. Cl.⁶ .................................................. G11B 23/087
[52] U.S. Cl. .................................................... 242/345.2
[58] Field of Search ........................ 242/343.2, 345.2, 242/345; 267/158, 163; 360/132

[56] References Cited

U.S. PATENT DOCUMENTS

| | | | |
|---|---|---|---|
| 3,934,839 | 1/1976 | Serizawa | 242/345.2 X |
| 4,309,002 | 1/1982 | Saitou et al. | 42/345.2 X |
| 4,506,846 | 3/1985 | Gelardi et al. | |
| 4,557,433 | 12/1985 | Fitterer et al. | |
| 4,621,779 | 11/1986 | Fitterer et al. | |
| 4,629,144 | 12/1986 | Schoettle | |
| 4,655,408 | 4/1987 | Gelardi et al. | |
| 4,845,590 | 7/1989 | Mikolajczak | 361/386 |
| 4,899,243 | 2/1990 | Bordignon | 360/132 |
| 4,903,916 | 2/1990 | Carroll | |
| 4,916,566 | 4/1990 | Urayama | 242/345 |
| 4,946,148 | 8/1990 | Kim | 267/158 |
| 4,986,491 | 1/1991 | Gelardi et al. | |
| 5,079,815 | 1/1992 | Carroll | 29/173 |
| 5,094,434 | 3/1992 | Ryu | 267/158 |
| 5,195,696 | 3/1993 | Kee Dong | 242/345.2 |
| 5,297,753 | 3/1994 | Abe | 242/345 |
| 5,326,048 | 7/1994 | Kim | 242/343.2 |
| 5,332,172 | 7/1994 | Tollefson | 242/345.2 |

FOREIGN PATENT DOCUMENTS 2556486  6/1985  France.
2090812  7/1982  United Kingdom.

Primary Examiner—Daniel P. Stodola
Assistant Examiner—William A. Rivera
Attorney, Agent, or Firm—Gary L. Griswold; Walter N. Kirn; Charles D. Levine

[57] ABSTRACT

A spring includes a central mounting portion mounted to an inner surface of a cassette housing and elongated pressure portions extending from the mounting portion to engage the cassette reels. Each pressure portion includes a central base and a pair of spring portions. The spring portions extend from the base at an angle to define a channel. Each spring portion has a free edge which engages the inner surface of the housing and forces the pressure portion into engagement with the reel. The spring portions can engage raised portions of the housing inner surface to divide the total spring force between two regions of the housing.

16 Claims, 5 Drawing Sheets

5,484,117

REEL SPRING FOR A THIN-WALLED VIDEOCASSETTE

TECHNICAL FIELD

This invention relates generally to springs for use in aligning a tape reel. In particular, the present invention is a plastic leaf-like spring for applying axial alignment pressure to a tape reel in a videocassette having a cover of reduced wall thickness.

BACKGROUND OF THE INVENTION

Magnetic tape cartridges or cassettes (e.g., videocassettes) are ubiquitous. The magnetic tape in these cassettes is wound onto reels which are rotatably mounted within a housing. These cassettes typically includes a spring which is mounted to the housing and engages wear buttons on the axial centers of the reels. The spring applies axial pressure to the reels to insure proper engagement with the drive spindle of the cassette drive. It also prevents the reels from being jostled around when the cassette is transported.

One of the specifications of VHS videocassettes requires that the reel pressure spring provide a loading or pressure of between 280 and 380 grams when the spring ends are depressed to a distance of approximately 0.080 inches from the spring mounting surface (an inside wall of the cassette).

One spring is a stainless steel strip which is fastened at the center to the inner surface of an upper housing wall. The free ends of the strip are bent into upwardly opening arcs away from the housing wall. The free ends are cantilevered from the center portion of the strip and resiliently engage, adjacent their outer ends, the hubs of the reels to bias the reels away from the upper housing wall. Since the force exerted by this type of reel spring on the housing wall can be significant, the housing wall must be sufficiently strong, and hence sufficiently thick, to withstand the reel spring force without excessive deformation.

There is a continuing need for improved reel springs for videocassettes which place a lower demand upon the structural strength of the cassette cover to allow the use of thin-walled cassette covers while meeting the specifications and reducing cost. Because videocassettes are produced in high volumes, small changes in piece part costs can have a large effect upon overall production costs. For this reason, improvements resulting in even a small reduction in a piece part cost can result in significant improvements in the commercial viability of the product.

SUMMARY OF THE INVENTION

The present invention is an inexpensive spring for applying pressure between a cassette housing and the tape reels in the housing. The spring includes a central mounting portion mounted to the inner surface of the housing and a pair of elongated pressure portions extending from opposite sides of the mounting portion toward the reels to engage respective reels. Each pressure portion includes a central base, which is aligned with the central mounting portion, and at least one spring portion. The spring portions are located along edges of the base. Each spring portion has a free edge which engages the inner surface of the housing and resiliently forces the pressure portion away from the housing while urging the pressure portion into engagement with the reel.

Each pressure portion can also include at least one stiffener portion located along the side edges of the base adjacent respective spring portions. Each stiffener portion abuts a respective spring portion and has a free edge. Each spring portion has one edge extending from the base and first, second, and third free edges.

The second free edges of the spring portions can engage raised portions of the housing inner surface. Under pressure, the spring portions deform and bend to urge the bases and the pressure portions away from the inner surface to urge the reels toward respective drive spindles. The primary points of application of force from the spring to the housing are along the raised portions of the window or cover to divide the total spring force between two regions of the housing.

DETAILED DESCRIPTION OF THE PREFERRED EMBODIMENTS

The present invention is an improvement on the plastic reel spring described in copending U.S. patent application Ser. No. 07/584,903. The spring 12 of this invention is capable of being used in thin-walled cassettes and with thinner covers. The spring 12 is formed to provide the requisite spring force without requiring the relatively thick cassette housing walls used in conventional cassettes.

Figure 1:
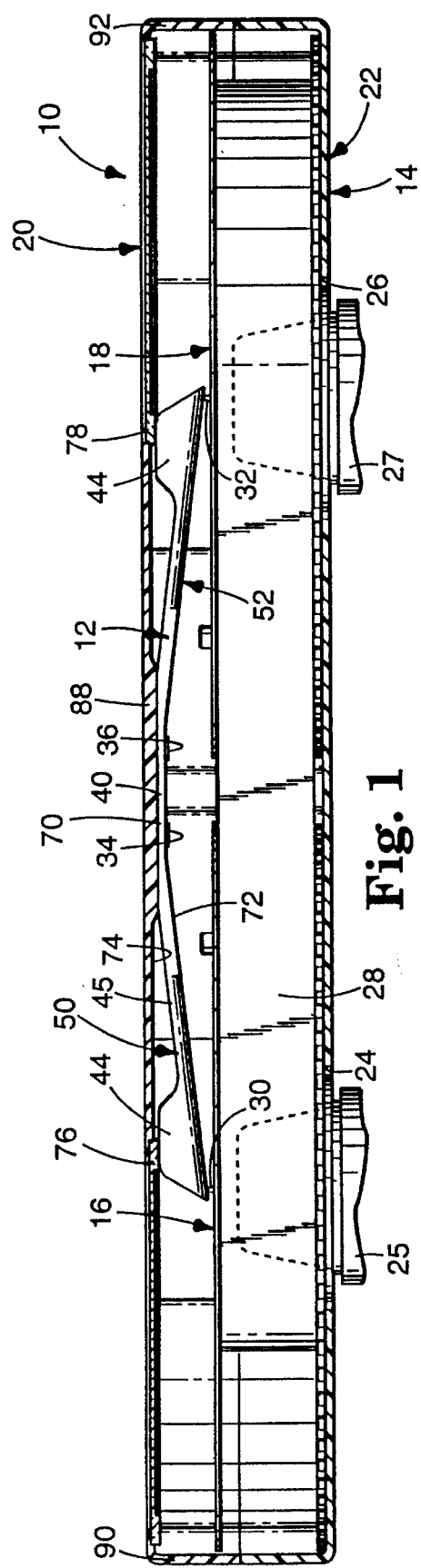
FIG. 1 is a cross sectional view of a VHS videocassette with tape drive spindles inserted.

Referring to FIG. 1, a videocassette 10 includes a housing 14, a pair of reels 16, 18, and a spring 12. The housing 14 is defined by a cover 20 and a base 22. Tape reels 16, 18 are rotatably mounted within the base 22. A pair of holes 24, 26 extend through the base 22, permitting splined drive spindles 25, 27 of a videocassette player/recorder (VCR) to engage and rotate the reels 16, 18. The tape reels 16, 18 are used for storing magnetic tape 28. As the magnetic tape 28 is transferred between the reels 16, 18, information can be transferred to and from the tape 28.

Wear buttons 30, 32 extend from an upper surface of respective reels 16, 18 and act as bearing members. The wear buttons 30, 32 provide small, smooth contact areas between the reels 16, 18 and the spring 12. Minimizing the contact area between the spring 12 and the rotating reels 16, 18 reduces the frictional interaction between these components, and lengthens the useful life of the videocassette 10.

The spring 12 is typically mounted to the inside surface of the cover 20 on posts 34, 36, although other types of fasteners (e.g., press fitting and adhesive) can be used. When the cover 20 and the base 22 are assembled to form a completed videocassette housing 14, the opposite free ends of spring 12 engage the wear buttons 30, 32 on each of the reels 16, 18.

When the cassette 10 is inserted into a VCR, the VCR drive spindles 25, 27 pass through the holes 24, 26 to engage the ribs of the reels 16, 18 and lift the reels away from the inside surface of the base 22. The spring 12 provides a force on the reels to keep them firmly seated on and engaged with their respective drive spindles. The spring 12 also prevents damage to the tape 28 by resisting axial motion of the reels 16, 18 when the videocassette 10 is handled and transported.

Figure 6:
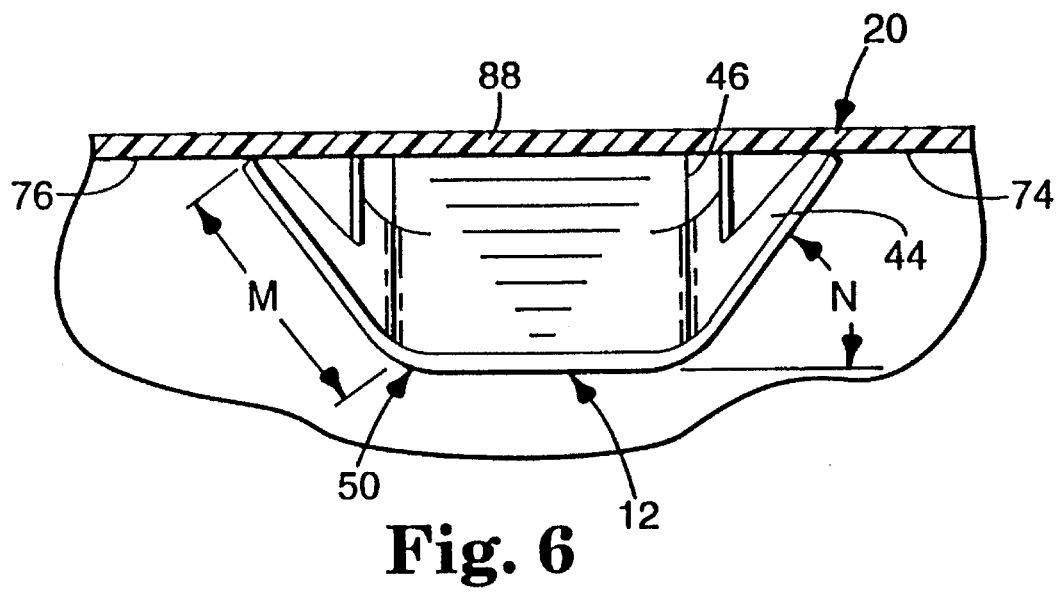
FIG. 6 is an end view of the spring in an noncompressed state.
Figure 7:
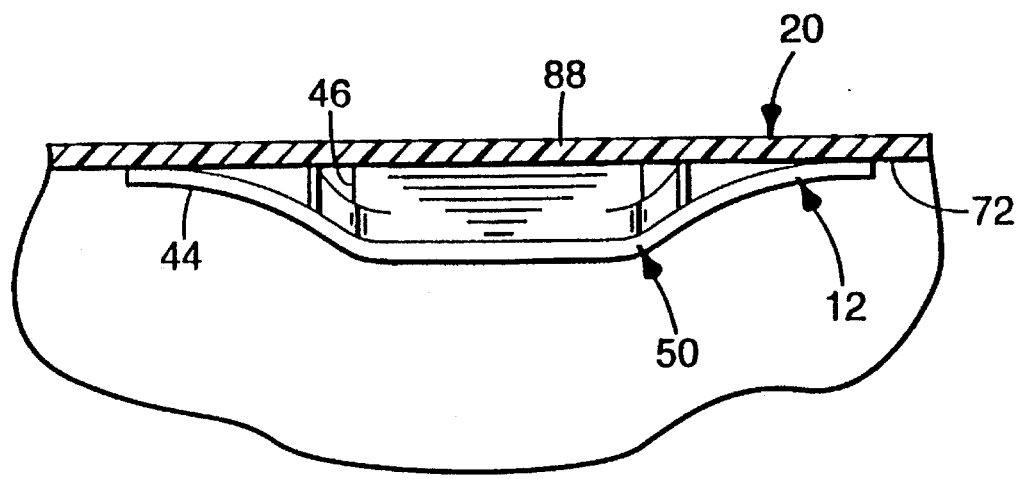
FIG. 7 is an end view of the spring in a compressed state.

One preferred embodiment of the spring 12 is shown in FIGS. 1, 2, 3A, 3B, 3C, 4A, 4B, 6 and 7. The spring 12 is preferably formed from a resilient plastic material such as polypropylene. The spring 12 has a pair of elongated pressure portions 38 joined at inner ends at a central mounting portion 40. The pressure portions 38 include a central base 42, a pair of spring portions 44, and a pair of stiffener portions 45. The base 42 of the pressure portions 38 and the central mounting portion 40 are aligned to form a longitudinal spine for the spring 12. As illustrated in FIG. 6 (an end view of the spring 12), the spring portions 44 extend upwardly from each base 42 to form an elongated channel along the base 42. The lateral cross-sectional shape of the channel is that of a truncated "V"; that is, a V-shaped with a flat bottom, as best seen in FIG. 6. Holes 48 in the central mounting portion 40 secure the spring 12 to the cover 20.

The spring 12 preferably is symmetrical. The spring 12 has a left half 50 and an identical right half 52. Likewise, the spring 12 has identical right and left sides, as shown in FIG. 4B. Thus, the spring portions are identical.

Figure 5:
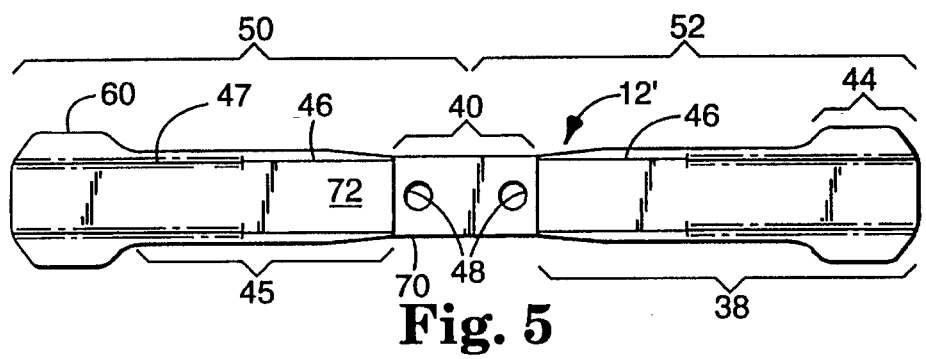
FIG. 5 is a top view of another embodiment of the spring.

Each spring portion 44 is defined along one edge either by a crease 46, by a rounded transition 47, or by both. The spring portion 44 is defined along the other edges by a first free edge 58, a second free edge 60, and a third free edge 62. The stiffener portion 45 abuts the spring portion 44 and has a free edge 64. The stiffener portion free edge 64 is linear and can extend generally parallel to the crease 46, as well as the longitudinal axis of the spring 12. The stiffener portion free edge 64 also includes an angled portion which angles to the edge of the mounting portion 40 and which can be parallel or collinear with the spring portion free edge 60. A free edge 70 defines the central mounting portion 40 of spring 12 although the mounting portion can project beyond the spine and form part of the stiffener portion. The first and third free edges 58, 62 extend angularly away from the line of the crease 46 and join the second free edge 60 to define a generally trapezoidal shape. Alternatively, as shown in FIG. 5, the spring portion free edge 60 and the crease 46 or the rounded transition 47 can be parallel or collinear.

As shown in the figures, the two spring portions 44 angle from the base 42 on each side of each pressure portion 38. When pressure is applied to the spring 12, before the spring portions 44 start to bend, the spring pivots slightly at the intersection of the mounting portion 40 and the stiffener portions 45 until that intersection contacts the raised portions 76, 78 of the cover 20.

The stiffener portion 45 prevents the base 42 from bending and from bowing toward and contacting the reels. This maintains clearance between the spring 12 and the reels 16, 18 and concentrates the spring force at the ends of the spring 12 in the spring portion 44. The stiffener portion 45 causes the spring force to move from the central mounting portion 40 toward the spring portions 44. The spring portion 44 is wider than the stiffener portion 45. The narrowness of the stiffener portion 45 is selected to avoid contact between the stiffener portion 45 and the inner surface 74 of the cover 20. This eliminates contact and potential scraping and abrasion problems. Also, the spring portion 44 is thinner than the base 42, in one embodiment being 0.012 inches thick with the base being 0.020 inches thick.

Preferred methods of fabricating the spring 12 include injection molding, and stamping a blank from a sheet of plastic followed by bending the spring portions 44. Injection molding produces lower cost parts when large quantities are required. Stamping and bending allows lower cost tooling to be used to reduce costs when fewer parts are needed. When injection molding, the spring 12 can accommodate a raised portion and a central gate on the mounting portion 40 on the side that faces the inner surface 74. Using a single central gate eliminates mold lines from a multiple gate configuration, reduces cracking on the spring ends, and moves the gate area away from the locations of reel-spring-cover interface.

One preferred embodiment of the spring 12 has the dimensions represented by letters A-K in FIGS. 4B and 6 where: A=3.937 inches; B=0.281 inches; C=0.625 inches; D=1.656 inches; E=0.156 inches; F=0.414 inches; G=30 degrees; H=0.060 inches radius; I=0.250 inches; J=0.375 inches; and K=0.750 inches and M=0.250 inches. The preferred angle between the free edge 64 and the free edge 70 is about 13 degrees. Thus, as shown, the length of the free edge 60 is 7% of the total length of the spring 12. It is desired that this percentage be as small as possible while creating a sufficient length to provide sufficient spring force. Lengths less than 15% of the total spring length are desired.

Each spring portion 44 is aligned relative to the base 42 at an angle ranging from 30-70 degrees, as illustrated by the angle N in FIG. 6. For example, a spring of this type which is molded from polypropylene material having a thickness of from 0.012 to 0.020 inches has been found to meet the required specifications for a VHS videocassette spring. A spring thus formed provides a resistive bias force when pressure is applied to its free ends in an attempt to flatten its spring portions.

As an alternative to plastic, the spring 12 may be formed from metal, provided that the thickness and other dimensions of the spring provide sufficiently low spring force. In all cases the spring material must meet the cost constraints imposed by high volume production in a competitive market for VHS videocassette.

Figure 4A:
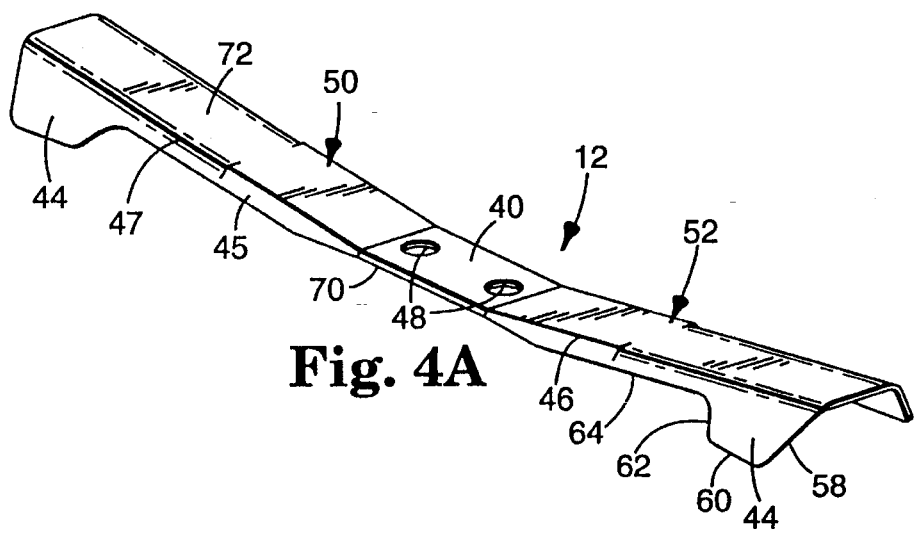
FIG. 4A is a perspective view of the spring according to the present invention.
Figure 4B:
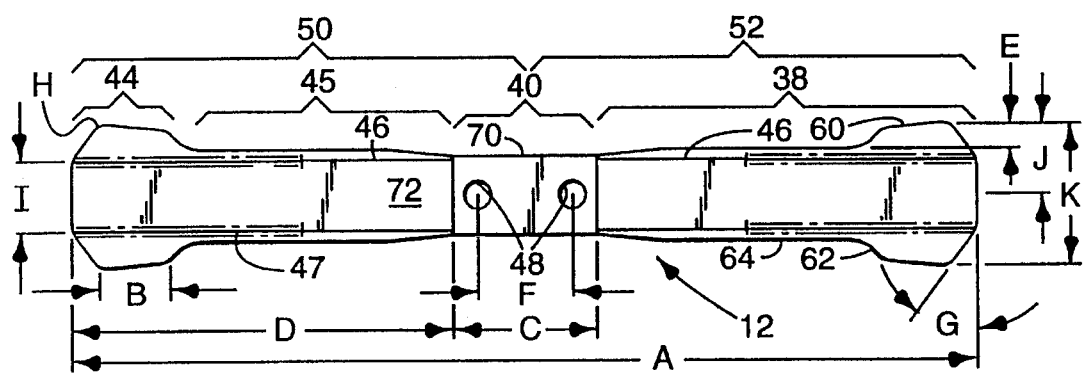
FIG. 4B is a top view of the spring shown in FIG. 4A.

The spring 12 in FIG. 4A is in a free-standing state, before mounting to a videocassette cover. The configuration of spring 12 when fastened to the cover 20, as well as the manner in which it operates, is shown in FIGS. 1, 2, 6, and 7. The spring 12 is fastened to the cover 20 such that a top face 72 of the mounting portion is pressed flat against an inner surface 74 of the cover 20. Thus, the open side of the channel is pressed against the inner surface 74 of the cover 20. The spring 12 is fastened on posts through the holes 48 or some other suitable fastening method.

The free edges 60 of the spring portions 44 of the spring 12 engage the raised portions 76, 78 of the cover 20, and bias their respective bases 42 away from the inner surface 74 of the cover 20, as shown in FIGS. 3 and 6. As the angle N decreases, the bases 42 become closer to the inner surface 74 of the cover 20. The free edges 60 of the spring portions 44 continuously engage the raised portions 76, 78 of the cover 20, and the spring portions 44 deform and bend at the creases 46 and rounded transitions 47 to urge the bases 42 and the pressure portions 38 away from the inner surface 74 of the cover 20. When the videocassette is placed in a VCR, the pressure portions 38 transfer this bias force from the spring 12 to the wear buttons 30, 32 of the reels 16, 18 to urge the reels toward their respective drive spindles. The pressure portions 38 are relatively narrow to engage the wear buttons 30 and 32 without interfering with the reels 16, 18 (see FIG. 1).

Figure 2:
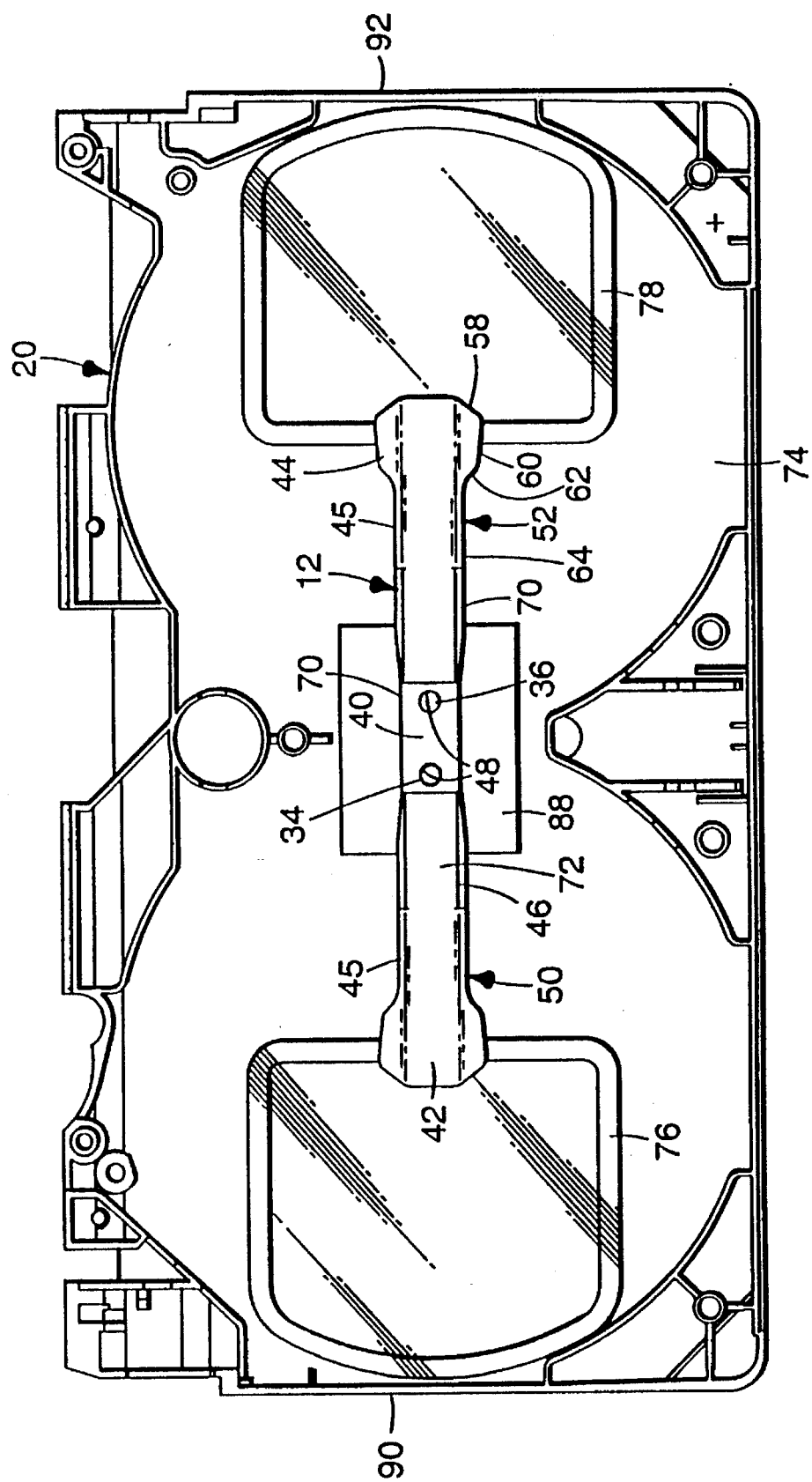
FIG. 2 is a plan view of the inside of a videocassette cover of FIG. 1 showing the spring of the present invention.
Figure 3A:
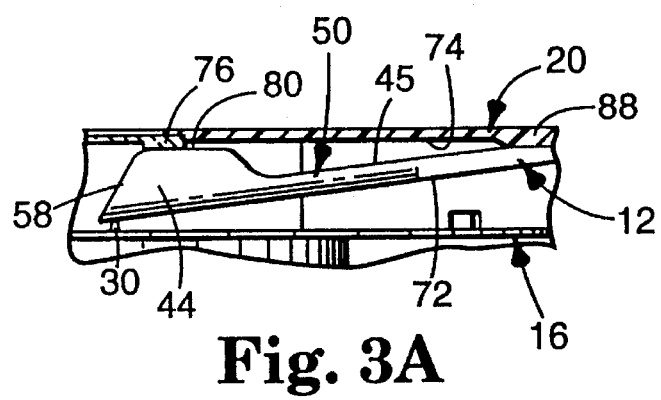
FIG. 3A is a partial side view of the spring in one version of a videocassette.
Figure 3B:
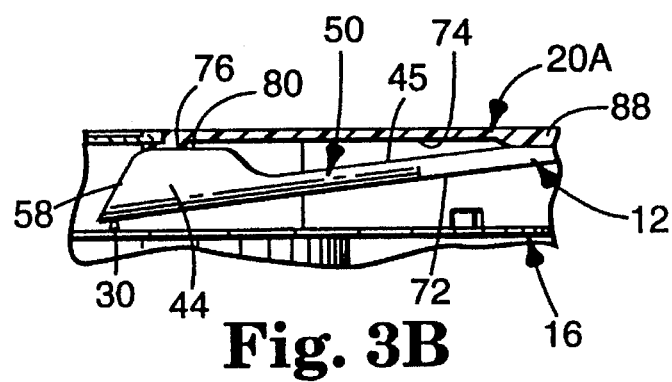
FIG. 3B is a partial side view of the spring in another version of a videocassette.
Figure 3C:
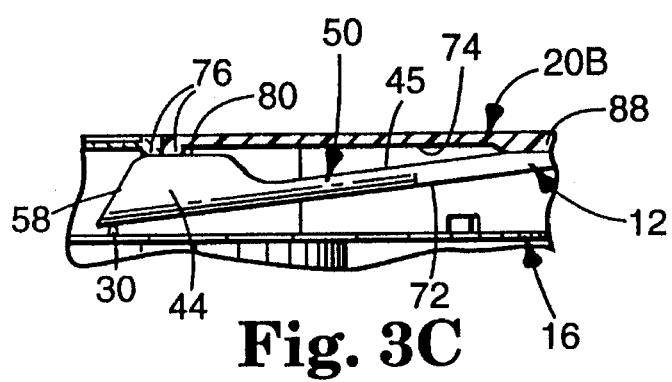
FIG. 3C is a partial side view of the spring in another version of a videocassette.

An important aspect of the present invention, shown in FIG. 2, is that the spring can be used in thin walled cassettes. The spring 12 provides its spring force not by cantilever action, as with conventional metal springs, but by pressing opposed spring portions against an inner surface of the cover 20. The primary points of application of force from the spring 12 to the cover 20 are located on thicker raised portions 76, 78 of the thin-walled cover 20, such as the raised portions of the cover itself or of the windows at their border, rather than at a center region 88 where the spring is mounted to the housing, as with conventional springs. As a result, the total spring force is divided between two regions of the cover, rather than being concentrated in the mounting portion.

Since the raised portions 76, 78 are regions of increased wall thickness, they are regions of greater structural strength and stiffness than the center region 88. By distributing the applied spring force over the cover at these strong points in the cover, the strength requirements of the center region 88 are reduced, and thinner walls can be used in the center region 88 to reduce the cost of this part. Also, shaping the second free edge 60 of the spring portion 44 with a short length enables the spring portion to rest stably on a relatively small, predetermined portion of the raised portions 76, 78.

Abrasion between the cover 20 and the spring 12 would lead to plastic shavings or other debris finding its way onto the recording tape and the recording mechanism. Typically, the cover 20 is formed from a low-cost plastic. To avoid abrasion, the free edges of the spring 12 which engage the cover can have rounded edges. The free edges of the spring can be bent inwardly (toward each other) to form gently curved edges for the upright sides. Alternatively, the free edges of the spring can be bent outwardly (away from each other) to form a gently curved edge for each of the upright sides. Alternatively, the free edges of the spring can be formed with an enlarged or beaded edge to present a blunt or rounded edge profile for the upright sides. In addition, other commonly known precautions against abrasion can be taken. For example, if the spring is formed by injection molding, parting lines should not be placed in locations that would place flash in contact with the inner surface 74 of the cover 20. This is accomplished by having the mold parting line located on the opposite face adjacent to the edge 60. If the spring is formed by stamping and thermoforming, the thermoformed bends should be in such direction to place the more rounded side of the stamped part in contact with the cover 20 and prevent burrs on the spring from contacting the cover 20. It is desirable that the curved profile of the free edges of the spring portion be as large as possible to lessen the probability of an abrasive effect on the inner surface 74 of the cover 20.

While the described embodiments involve springs which have two symmetrical halves 50, 52, since the spring effect of the left half 50 operates independently from that of the right half 52, it is possible to form a spring having only one pressure portion simply by forming only half of the spring 12. Such a spring might be used in magnetic recording cassettes having only one reel, such as certain types of data cartridges and two piece videocassettes, or in cassettes where it is desirable for each reel to have its own separately made spring. Also, only one spring portion can be used and located anywhere on each pressure portion of the base 42.

Where each of two reels has its own separately made spring, it is, nevertheless, possible for the springs to be located in such a way that the mounting portions of the springs overlap, thereby allowing a single mounting device to be used for both springs. For example, if mounting is by posts passing through holes in the mounting portions of the springs, the holes in one spring can be coincident with the holes in the other to allow the same mounting posts to pass through both springs.

The spring of the present invention can be manufactured for a lower cost than conventional videocassette reel springs, and is easily mounted to the housing. By using lower cost materials, this spring meets the specified requirements for such a spring at a fraction of the cost of conventional springs. Because videocassettes are produced in high volume, a cost saving on any component part of the cassette is significant to the total cost of the videocassette assembly.

The use of relational terms, such as left, right, upper, and lower, are not intended to limit the invention. The directions up and down refer to FIG. 1, in which the orientation of the videocassette shown is in accordance with common practice in VCR's. As shown in FIG. 1, the drive spindles enter the videocassette from the bottom.

I claim:

1. An integral, one-piece spring of resilient sheet-like material for applying pressure between an inner surface of a cassette housing and reels rotatably mounted within the housing, wherein the spring comprises:

a central mounting portion mounted to the inner surface of the housing; and a pair of elongated pressure portions extending from opposite sides of the mounting portion and configured to engage one of the reels, wherein each pressure portion comprises a central base having side edges, wherein the base and the central mounting portion are aligned; and at least one spring portion located along a transverse edge of the base, wherein each spring portion extends from the base at an angle with the base, wherein each spring portion has a free edge which engages the inner surface of the housing and resiliently forces the pressure portion away from the housing while urging the pressure portion into engagement with the reel, and wherein the spring provides its spring force by pressing opposed spring portions against an inner surface of the housing to divide the total spring force between at least two regions of the housing.

2. The spring of claim 1 wherein each pressure portion comprises a pair of spring portions located along the side edges of the central base, wherein the spring portions extend upwardly from the central base at an angle with the central base along a crease to define a longitudinal channel.

3. The spring of claim 2 wherein the spring is located within the housing with the open side of the longitudinal channel pressed against the housing to deform the spring portions to bias the pressure portion into engagement with the reels.

4. The spring of claim 1 wherein the spring portions extend away from each other at an angle ranging from 30 to 70 degrees from upright and wherein the length of the free edge of the spring portion is less than 15% of the total length of the spring.

5. The spring of claim 1 wherein each pressure portion comprises at least one stiffener portion located along a side edge of the base adjacent a respective spring portion.

6. The spring of claim 5 wherein each spring portion is defined by first, second, and third free edges, wherein the stiffener portion abuts the spring portion and has a free edge, and wherein the stiffener portion free edge and the spring portion second free edge are generally parallel to each other.

7. The spring of claim 6 wherein the first and third free edges extend angularly away from the crease and adjoin the second free edge to define a generally trapezoidal shape.

8. The spring of claim 5 wherein each spring portion is defined by first, second, and third free edges, wherein the stiffener portion abuts the spring portion and has a free edge that includes an angled portion which angles to an edge of the mounting portion, and wherein the stiffener portion free edge angled portion and the spring portion second free edge are collinear.

9. The spring of claim 1 wherein the spring has openings and is fastenable to the housing by posts on the housing mating with the openings.

10. The spring of claim 1 wherein the second free edges of the spring portions engage the housing inner surface and bias their respective bases away from the inner surface to urge the bases and the pressure portions away from the inner surface to urge the reels toward respective drive spindles.

11. A cassette comprising:

a housing comprising a base and a cover;

a pair of reels rotatably mounted within the housing; and an integral, one-piece spring of resilient sheet-like material for applying pressure between the housing and reels, the spring comprising:

a central mounting portion mounted to the inner surface of the housing;

a pair of elongated pressure portions extending from opposite sides of the mounting portion toward the reels and configured to engage one of the reels, wherein each pressure portion comprises a central base having side edges, wherein the base and the central mounting portion are aligned; and at least one spring portion located along a transverse edge of the central base, wherein each spring portion extends from the central base at an angle with the central base, wherein each spring portion has a free edge which engages the inner surface of the housing and resiliently forces the pressure portion away from the housing while urging the pressure portion into engagement with the reel, and wherein the spring provides its spring force by pressing opposed spring portions against an inner surface of the housing to divide the total spring force between at least two regions of the housing.

12. The cassette of claim 11 further comprising windows in the housing and a thicker raised portion of the housing comprising a portion of the cover which surrounds and frames the windows, wherein the free edge of each spring portion contacts the thicker walled portion of the housing.

13. The cassette of claim 11 further comprising windows in the housing and a thicker raised portion of the housing comprising a border portion of the windows, wherein the free edge of each spring portion contacts the thicker walled portion of the housing.

14. The cassette of claim 11 wherein the spring provides its spring force by pressing opposed spring portions against an inner surface of the housing to divide the total spring force between at least two regions of the housing.

15. The cassette of claim 11 wherein the cover is a thin-walled cover.

16. An integral, one-piece spring of resilient sheet-like material for applying pressure between an inner surface of a cassette housing and reels rotatably mounted within the housing, wherein the inner surface of the cassette includes thicker raised portions, wherein the spring comprises:

a central mounting portion mounted to the inner surface of the housing; and a pair of elongated pressure portions extending from opposite sides of the mounting portion and configured to engage one of the reels, wherein each pressure portion comprises a central base having side edges, wherein the base and the central mounting portion are aligned; and at least one spring portion located along a transverse edge of the base, wherein each spring portion extends from the base at an angle with the base, wherein each spring portion has a free edge which engages the inner surface of the housing and resiliently forces the pressure portion away from the housing while urging the pressure portion into engagement with the reel, wherein the free edge of each spring portion contacts a respective thicker raised portion of the housing, and wherein the spring provides its spring force by pressing opposed spring portions against an inner surface of the housing to divide the total spring force between at least two regions of the housing.

* * * * *